(Model.)
E. HOXIE.
THILL COUPLING.
No. 267,533. Patented Nov. 14, 1882.
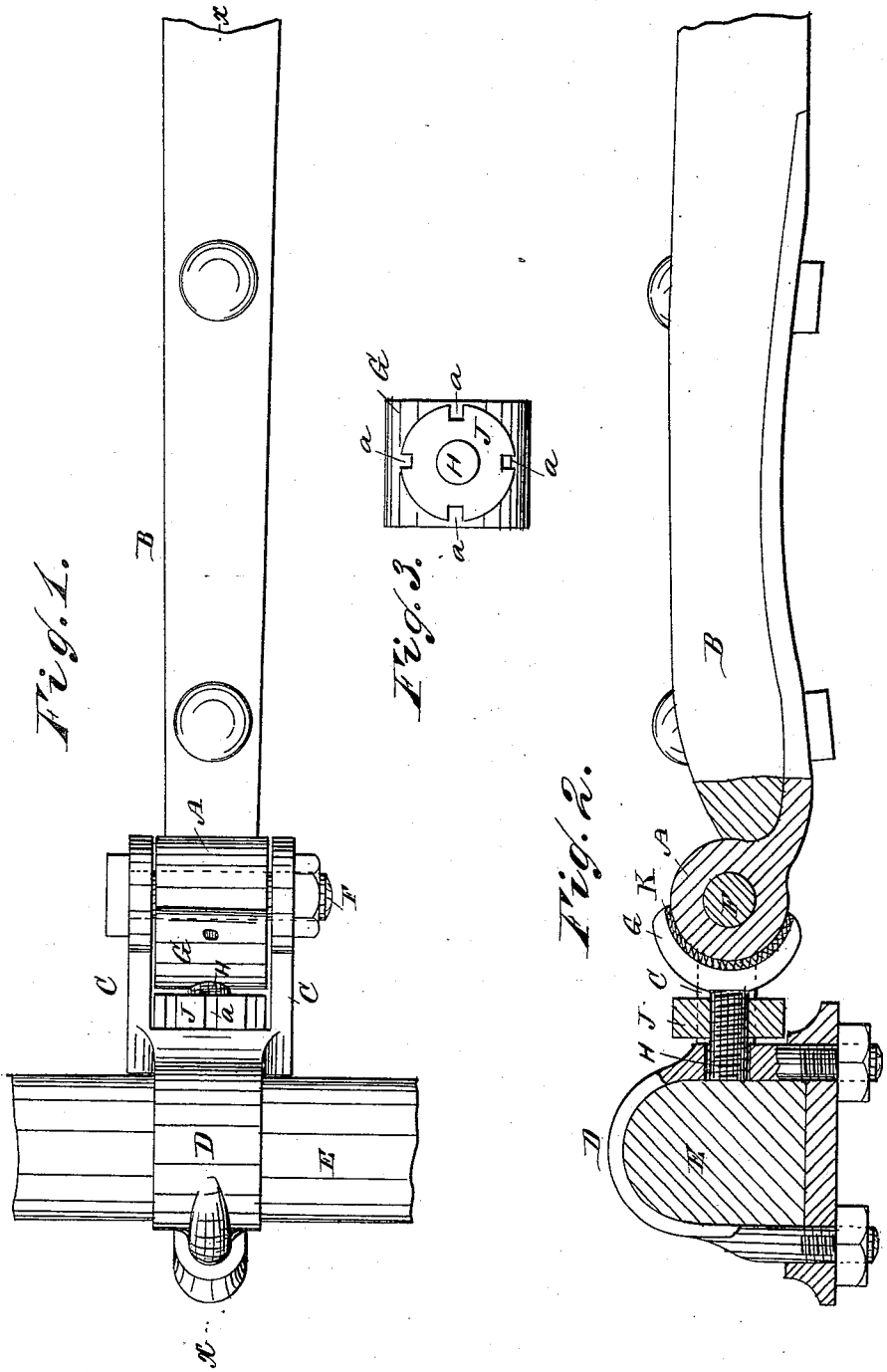
WITNESSES:
Theo. G. Hoster
C. Sedgwick
INVENTOR:
E. Hoxie
BY Munn & Co
ATTORNEYS.

UNITED STATES PATENT OFFICE.

ELIAS HOXIE, OF RED CREEK, NEW YORK.

THILL-COUPLING.

SPECIFICATION forming part of Letters Patent No. 267,533, dated November 14, 1882.

Application filed April 19, 1882. (Model.)

*To all whom it may concern:*

Be it known that I, ELIAS HOXIE, of Red Creek, in the county of Wayne and State of New York, have invented a new and Improved Thill-Coupling, of which the following is a full, clear, and exact description.

The object of my invention is to prevent the rattling of the thill-coupling; and the invention consists in the peculiar construction and arrangement of parts, as hereinafter more fully set forth.

Reference is to be had to the accompanying drawings, forming a part of this specification, in which similar letters of reference indicate corresponding parts in all the figures.

Figure 1 is a plan view of my improved thill-coupling, showing it attached to the thill and axle. Fig. 2 is a longitudinal sectional elevation of the same on the line $x\,x$, Fig. 1. Fig. 3 is a rear elevation of the adjustable brace or plate and adjusting-nut.

The eye A at the rear end of the thill B passes in between two jaws, C, projecting from the front shank of a clip, D, secured on the axle E in the usual manner, to which jaws C the eye A is pivoted by means of a pintle, F, passing through the jaws and the eye. A semicircular or segmental plate or brace, G, a lapted to fit against the eye A, is provided with a threaded stem, H, projecting from the outer curved surface of the plate or brace G, and which is adapted to be passed into an aperture in the front shank of the clip D. A nut, J, provided with a series of transverse grooves or notches, $a$, in its edge, or which has its edge milled or serrated, is mounted on the stem H of the brace or plate G. A layer, K, of packing material may be interposed between the eye A and the brace or plate G, if desired. By turning the nut J the plate or brace G is pressed against the eye with more or less force, and by pressing against the eye A does not prevent the eye from turning between the jaws, but prevents rattling of the parts of the coupling. If the thill is to be uncoupled, the nut J is turned in the inverse direction to withdraw the plate or brace G from the eye, so that the same can be withdrawn.

I am aware that a thill-coupling in which a plate for holding a rubber spring against the edge of the thill-irons is swiveled to a screw-threaded stud having a head and passing through a screw-threaded hole in the clip, and provided with lock-nut, has heretofore been employed, and I therefore lay no claim to such construction.

In my invention I dispense entirely with the head of the stud, the threading of the orifice in the clip, and the swiveling of the plate to the stud, thereby rendering my construction simpler, cheaper, and less liable to get out of order.

Having thus described my invention, I claim as new and desire to secure by Letters Patent—

In a thill-coupling, the combination, with the eye A of the thill-iron and the clip D, provided with an unthreaded orifice, of the curved plate G, having the threaded stem H, integral therewith, and lock-nut J, substantially as shown and described, and for the purpose set forth.

ELIAS HOXIE.

Witnesses:
CHARLES O. PETERSON,
I. B. DECKER.